United States Patent
Janosi et al.

(10) Patent No.: US 9,503,999 B2
(45) Date of Patent: Nov. 22, 2016

(54) SERVICE CONTINUITY IN CENTRALIZED SERVICE NETWORK SYSTEM

(71) Applicant: NOKIA SOLUTIONS AND NETWORKS OY, Espoo (FI)

(72) Inventors: Laszlo Janosi, Budapest (HU); Andras Pasztor, Budapest (HU); Attila Molnar, Göd (HU); Andras Janko, Érd (HU); Gergely Csatari, Budapest (HU); Andras Szeman, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/896,518

(22) PCT Filed: Jun. 7, 2013

(86) PCT No.: PCT/EP2013/061756
§ 371 (c)(1),
(2) Date: Dec. 7, 2015

(87) PCT Pub. No.: WO2014/194961
PCT Pub. Date: Dec. 11, 2014

(65) Prior Publication Data
US 2016/0150497 A1     May 26, 2016

(51) Int. Cl.
*H04W 4/00* (2009.01)
*H04W 60/06* (2009.01)
(Continued)

(52) U.S. Cl.
CPC .......... *H04W 60/06* (2013.01); *H04L 65/1016* (2013.01); *H04L 65/1073* (2013.01); *H04W 36/0022* (2013.01)

(58) Field of Classification Search
CPC ............ H04W 60/06; H04W 36/0022; H04L 65/1016; H04L 65/1073
See application file for complete search history.

(56) References Cited

U.S. PATENT DOCUMENTS

2009/0213779 A1* 8/2009 Zhang .................. H04W 88/04
                                                  370/315
2011/0117914 A1* 5/2011 Yang ..................... H04W 76/06
                                                 455/435.1
(Continued)

FOREIGN PATENT DOCUMENTS

WO     2007/107185 A1    9/2007
WO     2009/150092 A1   12/2009

OTHER PUBLICATIONS

International Search Report and Written Opinion mailed Apr. 30, 2014, issued in corresponding International Application No. PCT/EP2013/061756.

(Continued)

*Primary Examiner* — Ajit Patel
(74) *Attorney, Agent, or Firm* — Squire Patton Boggs (US) LLP

(57) ABSTRACT

There are provided measures for enabling/realizing service continuity in a centralized service network system. Such measures exemplarily comprise detecting a deregistration request for deregistering a terminal with respect to a first switching entity from a registration in which the first switching entity is registered for the terminal as a contact point for centralized services, starting a waiting timer for waiting for a registration request for registering the terminal with respect to a second switching entity upon detection of said deregistration request, and re-registering the terminal in the registration such that the second switching entity is registered for the terminal as a contact point for centralized services upon detection of the registration request for registering the terminal with respect to the second switching entity before expiry of the waiting timer.

21 Claims, 16 Drawing Sheets

(51) Int. Cl.
*H04L 29/06* (2006.01)
*H04W 36/00* (2009.01)

(56) References Cited

U.S. PATENT DOCUMENTS

| | | | |
|---|---|---|---|
| 2011/0268098 A1 | 11/2011 | Keller et al. | |
| 2011/0320581 A1* | 12/2011 | Lindholm | H04L 67/1002 709/223 |
| 2012/0140764 A1* | 6/2012 | Sheth | H04L 65/1016 370/352 |
| 2014/0113626 A1* | 4/2014 | Park | H04W 68/02 455/435.1 |

OTHER PUBLICATIONS

3GPP TS 23.292 version 11.6.0 Release 11, Technical Specification, "Digital cellular telecommunications system (Phase 2+); Universal Mobile Telecommunications System (UMTS); LTE; IP Multimedia Subsystem (IMS) centralized services; Stage 2" Jun. 1, 2013, XP014157015; 121 pages.

3GPP TS 23.272 version 11.3.0, Technical Specification, "3rd Generation Partnership Project; Technical Specification Group Services and System Aspects; Circuit Switched (CS) fallback in Evolved Packet System (EPS); Stage 2 (Release 11)" Dec. 18, 2012, XP050691110; 93 pages.

3GPP TR 23.885 version 11.0.0, Technical Report, "3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 11)" Sep. 23, 2011, XP050553882; 83 pages.

3GPP TS 23.401 V10.7.0 (Mar. 2012), Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 10)" Mar. 12, 2012; 278 pages.

3GPP TS 23.402 V12.0.0 (Mar. 2013), 3rd Generation Partnership Project; Technical Specification Group Services and System Aspects; Architecture enhancements for non-3GPP accesses (Release 12) 253 pages.

* cited by examiner

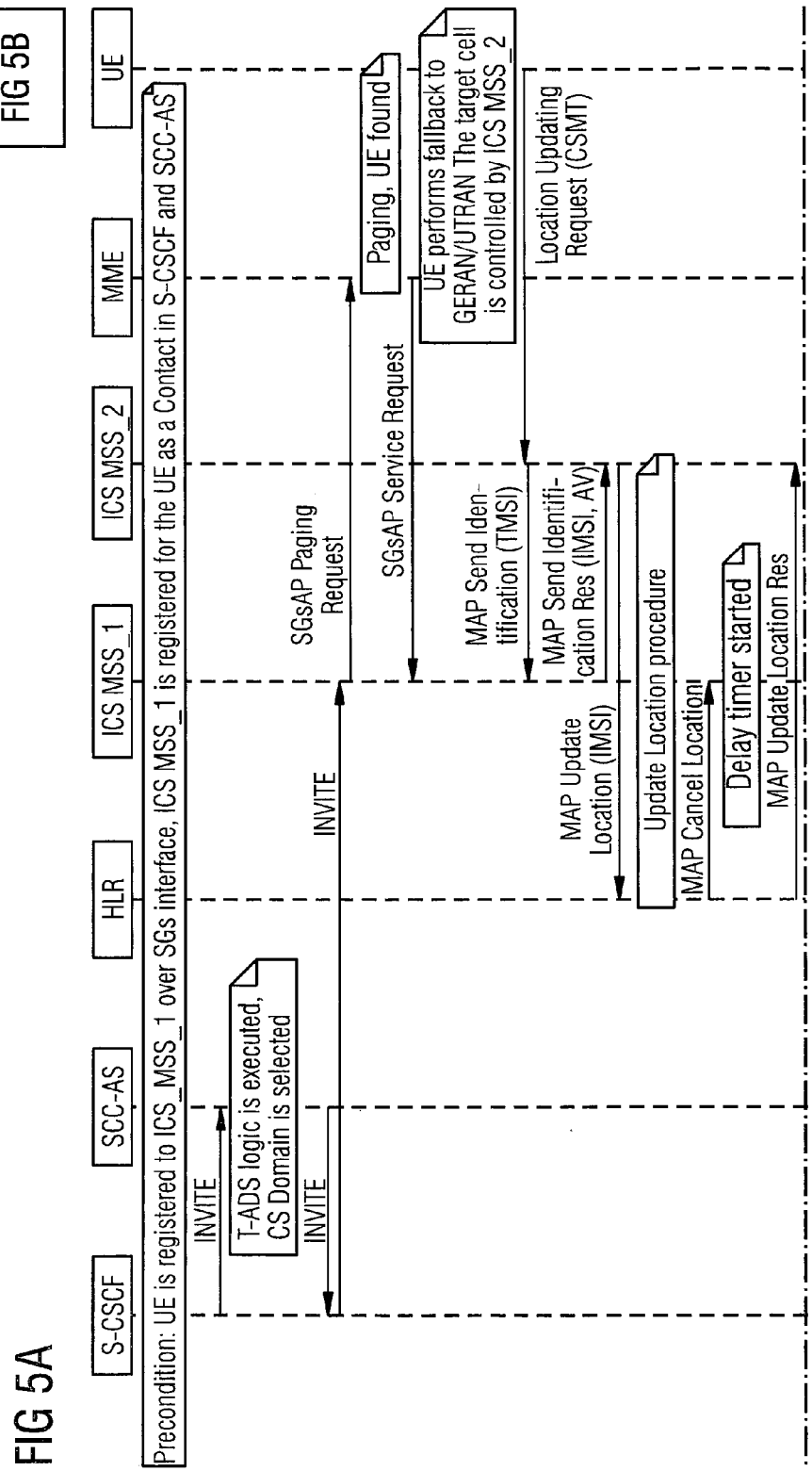

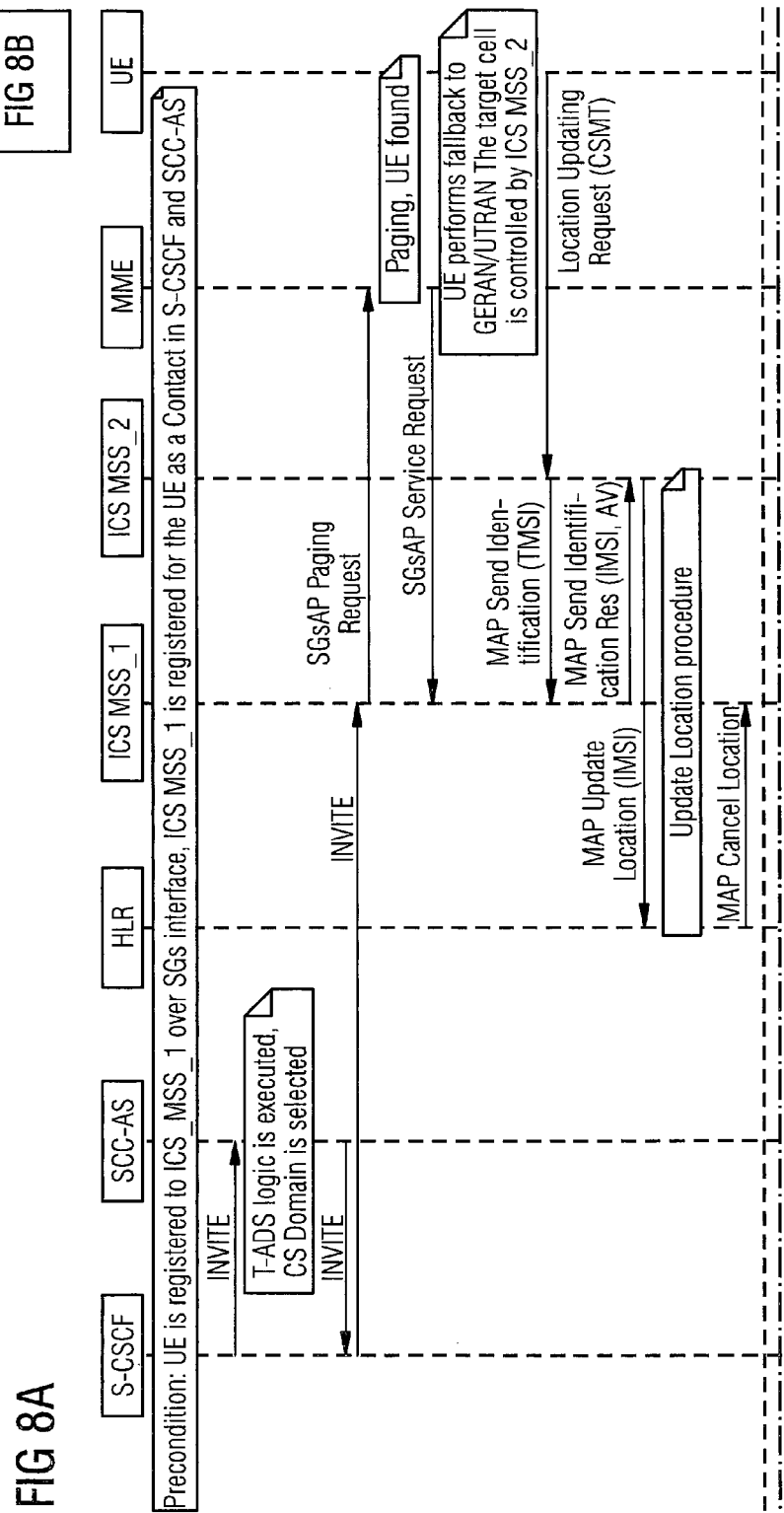

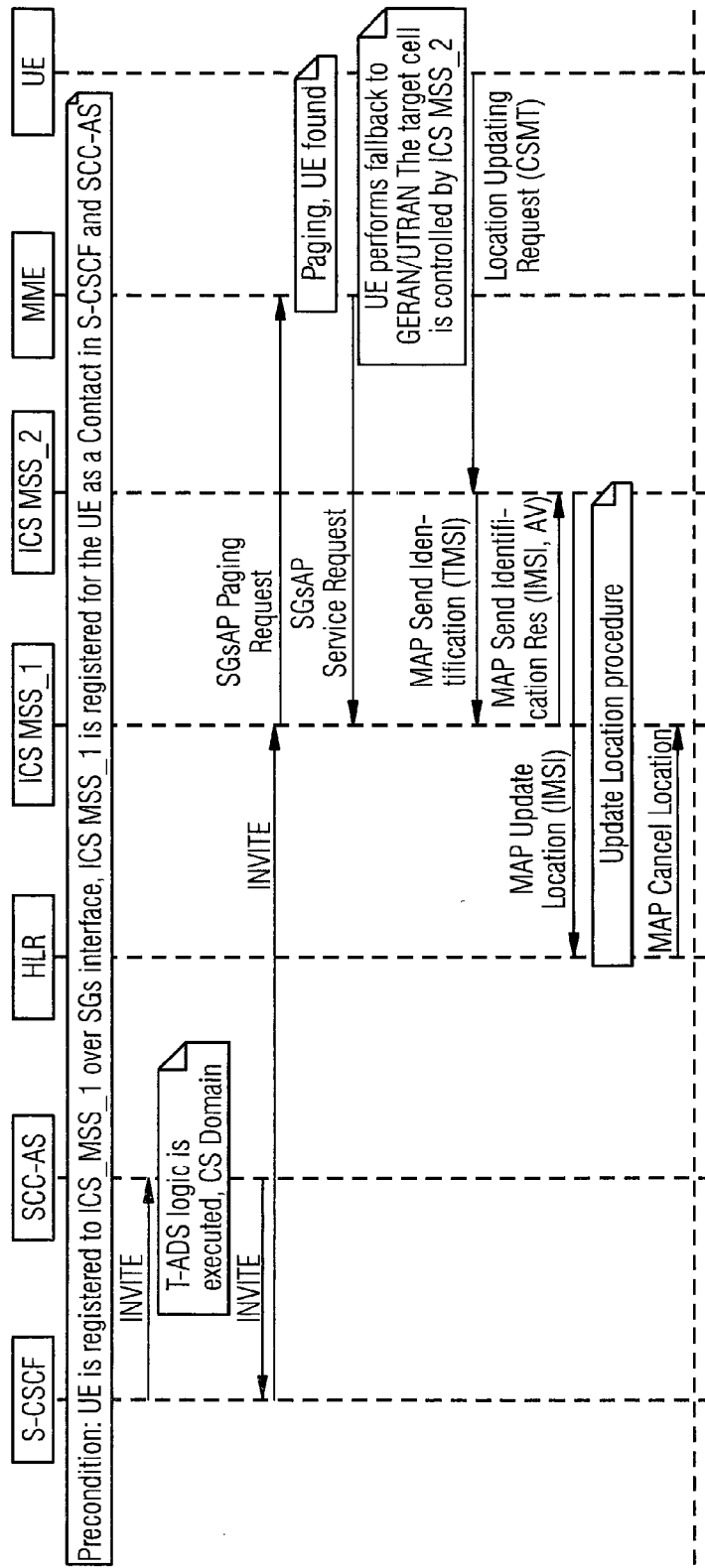

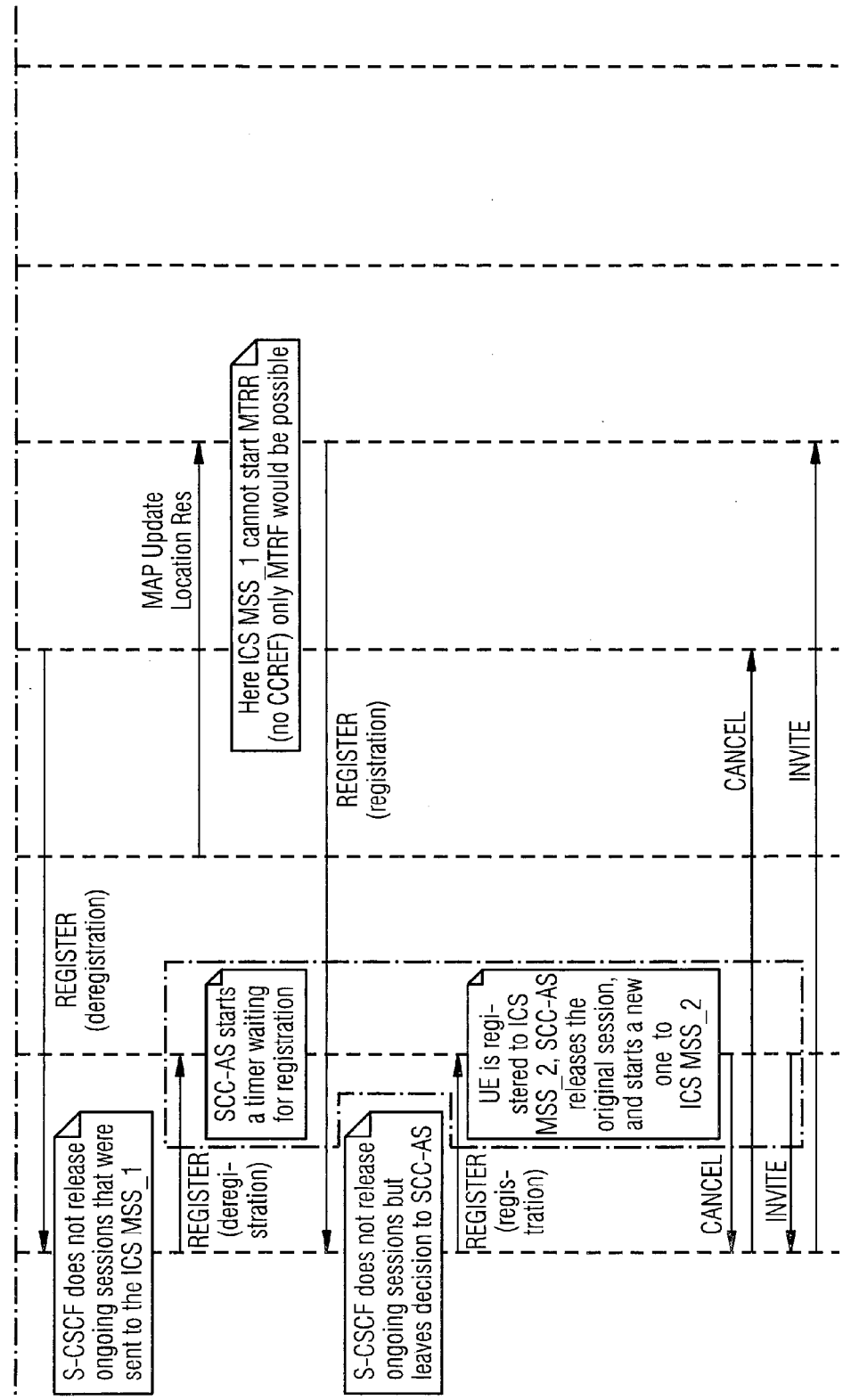

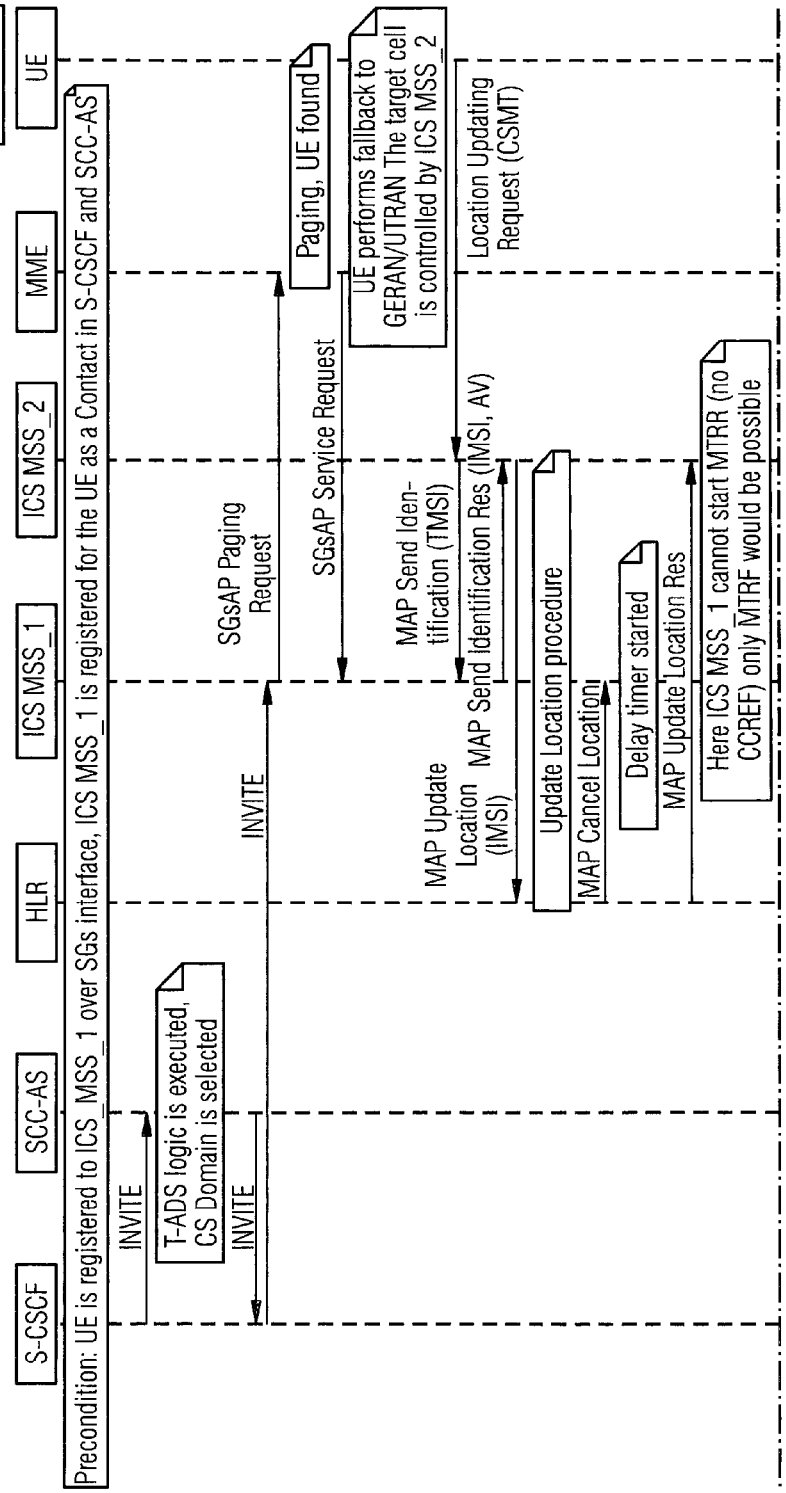

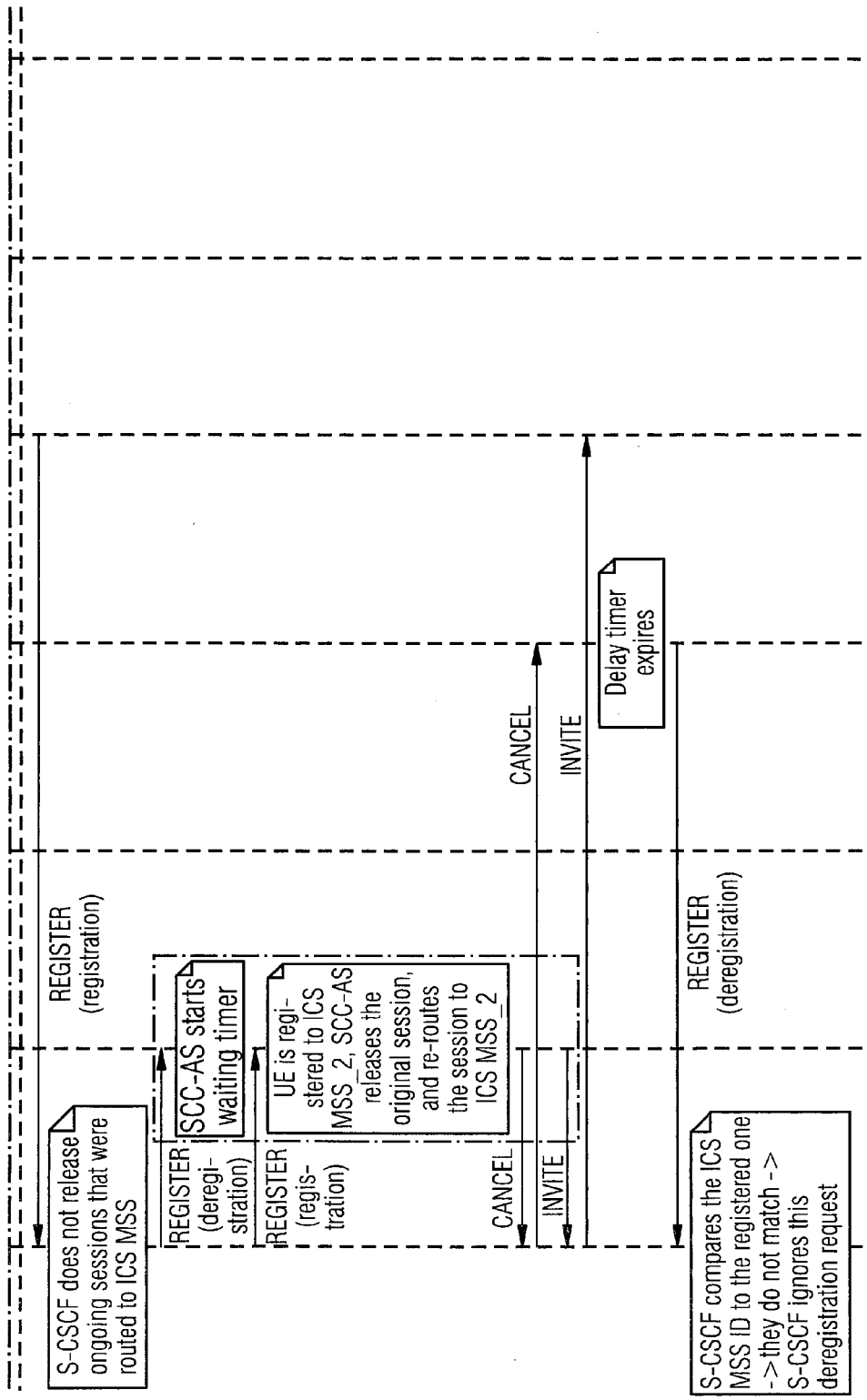

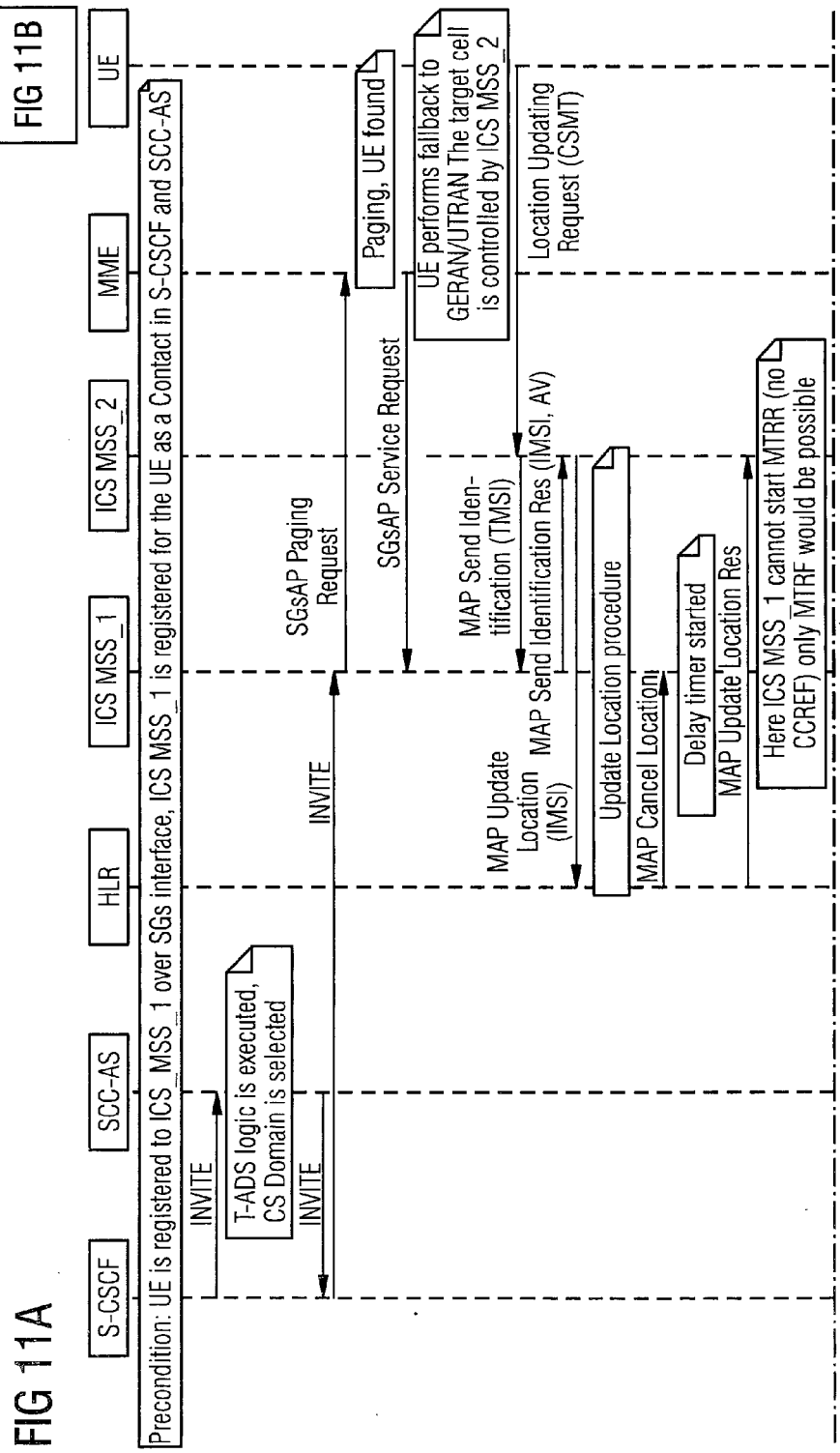

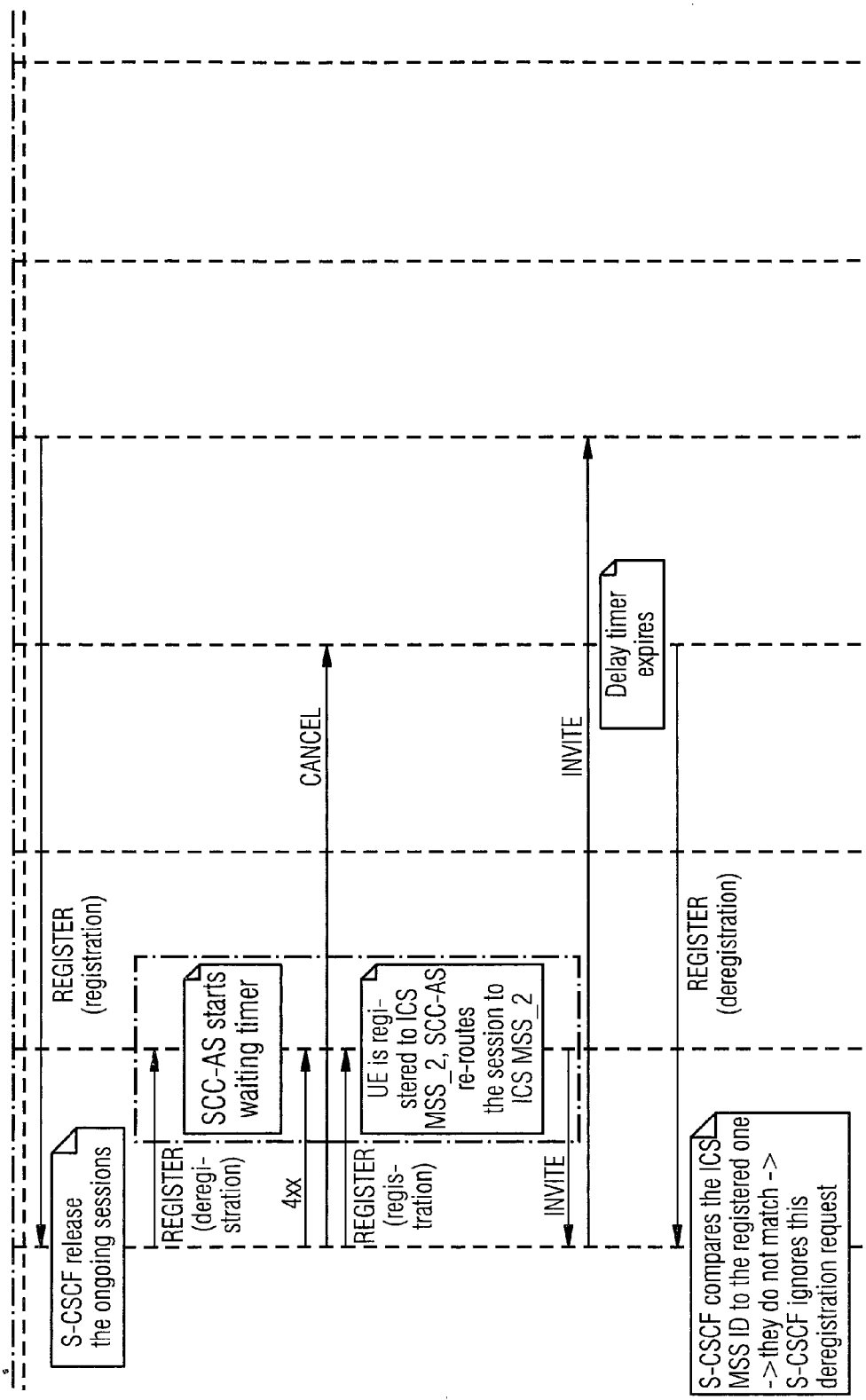

US 9,503,999 B2

SERVICE CONTINUITY IN CENTRALIZED SERVICE NETWORK SYSTEM

FIELD

The present invention relates to service continuity in a centralized service network system. More specifically, the present invention exemplarily relates to measures (including methods, apparatuses and computer program products) for enabling/realizing service continuity in a centralized service network system.

BACKGROUND

Current cellular communication systems according to 3GPP specifications are typically based on the Evolved Packet System (EPS) which provides a new radio interface and new core network functions for broadband wireless data access. The EPS radio interface consists of a packet-switched network access via E-UTRAN (which is provided in addition to the 2G/3G network accesses via UTRAN and GERAN. The EPS core network functions include the Mobility Management Entity (MME), the Packet Data Network Gateway (PDN-GW) and the Serving Gateway (S-GW).

FIG. 1 shows a schematic diagram illustrating the general EPS architecture according to 3GPP TS 23.401, which represents a first example of a communication system architecture.

The UE representing a subscriber can be camped on, and thus served by, any one of different network accesses, namely the E-UTRAN or the UTRAN or the GERAN, but not two network accesses simultaneously. That is, when the UE is camped on E-UTRAN, it is not reachable over UTRAN or GERAN. The MME is responsible for mobility management procedures in EPS. Specifically, it is responsible for knowing the subscriber's location in the E-UTRAN, it authenticates the subscriber, and it supervises the resources granted for subscribers via controlling the PDN-GW and the S-GW.

In case specific services could not be provided to a subscriber in the EPS by way of its packet-switched network access, i.e. via the E-UTRAN, there is specified Circuit-Switched Fallback (CSFB). Such Circuit-Switched Fallback is for example useful for the initial phase of EPS deployments (when EPS access is available in limited areas only) so to make usual services like call, SMS, USSD and locationing available for UEs that are camped on E-UTRAN.

FIG. 2 shows a schematic diagram illustrating the EPS architecture for CS fallback and SMS over SGs according to 3GPP TS 23.272, which represents a second example of a communication system architecture.

The EPS architecture for CS fallback and SMS defines the SGs interface between MME and MSC Server/VLR (which could also be referred to as a mobile switching system MSS). When a UE registers in the EPS, it can indicate its CSFB capability in the request. If the EPS supports CSFB, the MME performs a location update on the SGs interface on behalf of the UE to an MSC Server/VLR. In turn, the MSC Server/VLR downloads CS subscription data from the HLR with a normal location update procedure. So, the UE will be registered into the MSC Server/VLR. Then, mobile-terminated (MT) CS events of the UE (e.g. call, SMS, Mobile-Terminated location request, USSD) will be routed to the MSC Server/VLR. When the MT CS event arrives at the MSC Server/VLR, the MSC Server/VLR sends a paging request to the MME over the SGs interface to indicate the incoming MT CS event and to search the UE. For call, USSD and location request procedures, the UE is then forced back to a CS network (i.e. UTRAN/GERAN) with a CSFB mechanism. When the UE is camped on the CS network, the actual MT CS procedure (e.g. call, SMS, location request, USSD) is executed by the MSC Server/VLR as if the UE was originally served in the CS domain. When the MT CS procedure is completed, i.e. the service is executed, the UE returns to the EPS, namely the E-UTRAN.

In an effort to ensure consistent service experience for subscribers, the IMS Centralized Service (ICS) concept is specified, which is applicable in the EPS framework. By the ICS concept, the services are provided centrally from the centralized IMS service domain, instead of being provided locally from a specific access domain. The centralized IMS service domain is access agnostic.

FIG. 3 shows a schematic diagram illustrating the ICS architecture according to 3GPP TS 23.292, which represents a centralized service architecture.

In the ICS architecture (also referred to as IMS service continuation and continuity reference architecture), the circuit-switched domain (including GERAN/UTRAN, MSC Server, etc.) becomes a simple CS access network which does not execute services itself, but only ensures that the UE sessions are delivered to the centralized IMS service domain where the services are actually executed. When an UE using ICS roams between the different access networks (like E-UTRAN and CS), the UE can use the same services independently from its currently used access because those are executed in the centralized IMS service domain.

When the UE is under CS access and performs a usual location update procedure to the MSC Server, the MSC Server registers itself in the IMS service domain, namely in the Service Centralization and Continuity Application Server (SCC-AS) therein, as a contact point for the UE for the provision/execution of centralized services. So, when a mobile-terminating session arrives at the SCC-AS for this UE, the SCC-AS will know to which MSC Server the session should be routed in order to reach the UE so as to provide/execute the service.

Accordingly, the service provision/execution for a UE in such centralized service network system, like the ICS service domain, is based on the registration of a mobile switching system as a contact point for centralized services for the UE. In order to ensure service continuity in such centralized service network system, like the ICS service domain, it is thus required to ensure a correct and continuous registration of the contact point for centralized services for the UE.

Such correct and continuous registration could however not be ensured with conventional procedures when the UE exercises mobility between different mobile switching centers, i.e. cells belonging to different mobile switching centers.

This will become evident from the following description of re-routing procedures in two exemplary scenarios of CSFB in the ICS architecture. In both exemplary scenarios, it is assumed that the UE is registered to ICS MSS_1 over the SGs interface, and ICS MSS_1 is registered for the UE as contact point for ICS in the S-CSCF and the SCC-AS. Further, it is assumed that the UE is to be re-routed from ICS MSS_1 (serving an E-UTRAN cell representing a source cell) to ICS MSS_2 (serving a GERAN/UTRAN cell representing a target cell) due to a CSFB mechanism.

FIG. 4 shows a signaling diagram of a conventional procedure in a first exemplary re-routing scenario, in which a deregistration request from ICS MSS_1 is issued before a registration request from ICS MSS_2 (as a result of the fact that MAP Cancel Location is issued by the HLR prior to MAP Update Location Response).

Initially, a MT call arrives at the SCC-AS, and the T-ADS functionality selects the CS domain. Accordingly, the call is routed to ICS_MSS_1 with using the specific contact information. To this end, the ICS MSS_1 starts paging the UE over the SGs interface. The UE performs CS fallback to a cell controlled by the ICS MSS_2, and starts a location updating procedure. In this context, the ICS MSS_2 may (optionally) send a MAP Send Identification to the ICS MSS_1, if a location update request was received with TMSI and ICS MSS_2 is configured properly. When a MAP Cancel Location is received from the HLR, the ICS MSS_1 sends a deregistration request to the S-CSCF to deregister itself from the S-CSCF and the SCC-AS. Hence, the S-CSCF releases the ongoing sessions of the UE (this call as well), and deregisters the UE from itself and the SCC-AS. When a MAP Update Location Response is received from the HLR, the ICS MSS_2 sends a registration request to the S-CSCF to registers itself to the S-CSCF and the SCC-AS. However, the call fails, as it has already been released (i.e. deregistration at the S-CSCF and the SCC-AS has already happened). Accordingly, the call fails in this re-routing situation, and thus there arises a problem in terms of service continuity.

FIG. 5 shows a signaling diagram of a conventional procedure in a second exemplary re-routing scenario, in which a deregistration request from ICS MSS_1 is issued after a registration request from ICS MSS_2 (as a result of the fact that, while MAP Cancel Location is issued by the HLR prior to MAP Update Location Response, a delay timer is used at the ICS MSS_1).

The initial procedure up to the update location procedure is the same as in the procedure of FIG. 4. When a MAP Cancel Location is received from the HLR, the ICS MSS_1 starts a delay timer to delay issuance of the deregistration request. When a MAP Update Location Response is received from the HLR, the ICS MSS_2 sends a registration request to the S-CSCF to registers itself to the S-CSCF and the SCC-AS. According to the current 3GPP specifications, if the S-CSCF receives such registration request, it shall release the ongoing sessions of the UE sessions (this call as well), thus deregistering the UE from itself and the SCC-AS, so the call will be released. After expiry of the delay timer, the ICS MSS_1 sends the deregistration request to the S-CSCF to de-register itself from the S-CSCF and the SCC-AS. As deregistration of the UE has already been performed, the S-CSCF ignores this deregistration request. Hence, the call fails, as it has already been released (i.e. deregistration at the S-CSCF and the SCC-AS has happened). Accordingly, the call fails in this re-routing situation, and thus there arises a problem in terms of service continuity.

In view of the above relating to cases of CSFB in the ICS architecture, if the UE is camped on E-UTRAN and is registered over the SGs interface to a first ICS MSS (i.e. is prepared for CS Fallback), it is considered as "CS Access", i.e. the first ICS MSS can perform registration to SCC-AS as contact point for the UE, because when a mobile-terminating session is delivered to the MSC Server, the UE will execute CS Fallback to GERAN/UTRAN. Hence, the call will fail due to the fact that the registration at the SCC-AS cannot be ensured to be correct in a continuous manner during such re-routing situation (taking into consideration the 3GPP-specified rules for the behavior of S-CSCF and SCC-AS, i.e. S-CSCF has to release the call when a deregistration or registration request arrives).

More generally, corresponding problems could arise even without applying CSFB in the ICS architecture. For examples, if the UE is camped on GERAN/UTRAN and is registered to a first ICS MSS (e.g. over the A/Iu/Gs interface) in the ICS architecture, it can move from its originally registered first ICS MSS to a new second ICS MSS while a call is being routed to it from the SCC-AS. In this case, the call will fail due to the fact that the registration at the SCC-AS cannot be ensured to be correct in a continuous manner during such re-routing situation (taking into consideration the 3GPP-specified rules for the behavior of S-CSCF and SCC-AS, i.e. S-CSCF has to release the call when a deregistration or registration request arrives).

Accordingly, there is a demand for enabling/realizing service continuity in a centralized service network system, especially in a situation of terminal mobility between different switching entities.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising detecting a deregistration request for deregistering a terminal with respect to a first switching entity from a registration in which the first switching entity is registered for the terminal as a contact point for centralized services, starting a waiting timer for waiting for a registration request for registering the terminal with respect to a second switching entity upon detection of said deregistration request, and re-registering the terminal in the registration such that the second switching entity is registered for the terminal as a contact point for centralized services upon detection of the registration request for registering the terminal with respect to the second switching entity before expiry of the waiting timer.

According to an exemplary aspect of the present invention, there is provided an apparatus comprising an interface configured to communicate with at least another apparatus, a memory configured to store computer program code, and a processor configured to cause the apparatus to perform: detecting a deregistration request for deregistering a terminal with respect to a first switching entity from a registration in which the first switching entity is registered for the terminal as a contact point for centralized services, starting a waiting timer for waiting for a registration request for registering the terminal with respect to a second switching entity upon detection of said deregistration request, and re-registering the terminal in the registration such that the second switching entity is registered for the terminal as a contact point for centralized services upon detection of the registration request for registering the terminal with respect to the second switching entity before expiry of the waiting timer.

According to an exemplary aspect of the present invention, there is provided an apparatus comprising means for detecting a deregistration request for deregistering a terminal with respect to a first switching entity from a registration in which the first switching entity is registered for the terminal as a contact point for centralized services, means for starting a waiting timer for waiting for a registration request for registering the terminal with respect to a second switching entity upon detection of said deregistration request, and means for re-registering the terminal in the registration such that the second switching entity is registered for the terminal as a contact point for centralized services upon detection of the registration request for registering the terminal with respect to the second switching entity before expiry of the waiting timer.

According to an exemplary aspect of the present invention, there is provided a computer program product comprising computer-executable computer program code which, when the program code is executed on a computer or the program is run on a computer (e.g. a computer of an apparatus according to any one of the aforementioned apparatus-related exemplary aspects of the present invention), is configured to cause the computer to carry out the method according to the aforementioned method-related exemplary aspect of the present invention.

The computer program product may comprise or may be embodied as a (tangible) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplary embodiments of the present invention, there is enabled/realized service continuity in a centralized service network system, especially in a situation of terminal mobility between different switching entities.

Thus, improvement is achieved by methods, apparatuses and computer program products enabling/realizing service continuity in a centralized service network system, especially in a situation of terminal mobility between different switching entities.

BRIEF DESCRIPTION OF THE DRAWINGS

In the following, the present invention will be described in greater detail by way of non-limiting examples with reference to the accompanying drawings, in which FIG. 9 shows a signaling diagram of a second example of a procedure in the first exemplary re-routing scenario according to exemplary embodiments of the present invention, FIG. 10 shows a signaling diagram of a first example of a procedure in the second exemplary re-routing scenario according to exemplary embodiments of the present invention, FIG. 11 shows a signaling diagram of a second example of a procedure in the second exemplary re-routing scenario according to exemplary embodiments of the present invention.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, for explaining applicability of thus described exemplary embodiments in an illustrative manner, an EPS/ICS system is used as a non-limiting example of a network system, and CSFB is used as a non-limiting example of the cause of a re-routing situation of a terminal. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Figure 1:
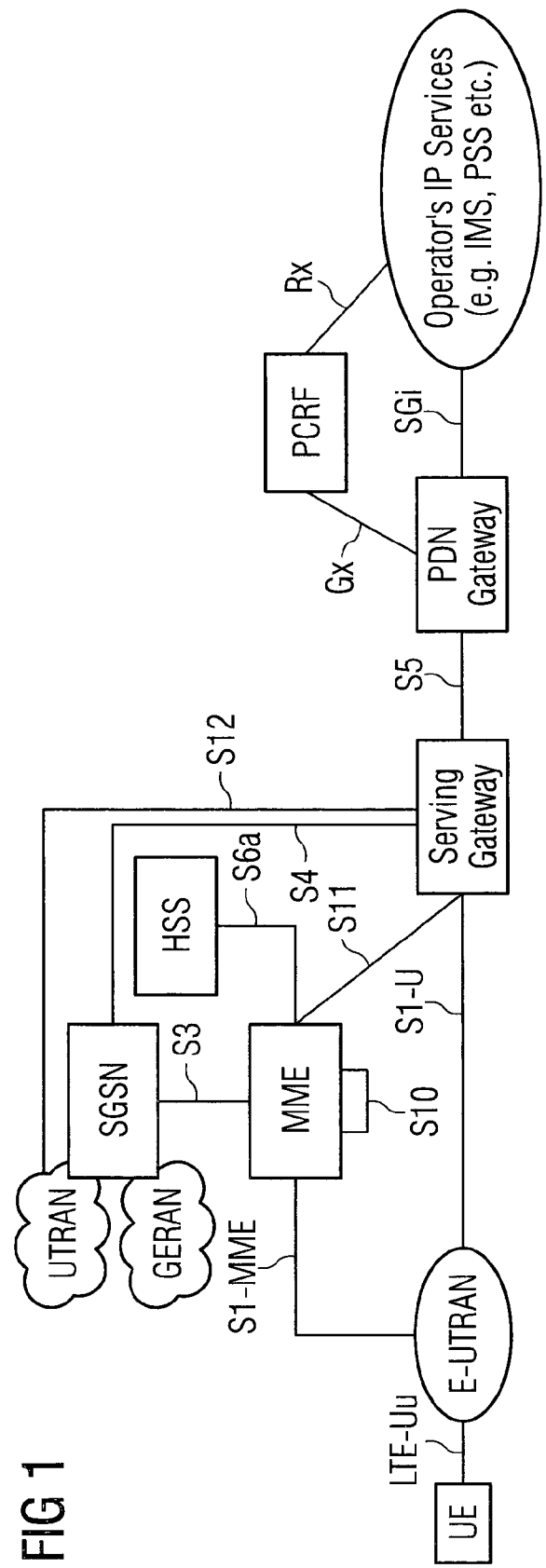
FIG. 1 shows a schematic diagram illustrating a first example of a communication system architecture, in which exemplary embodiments of the present invention are applicable.
Figure 2:
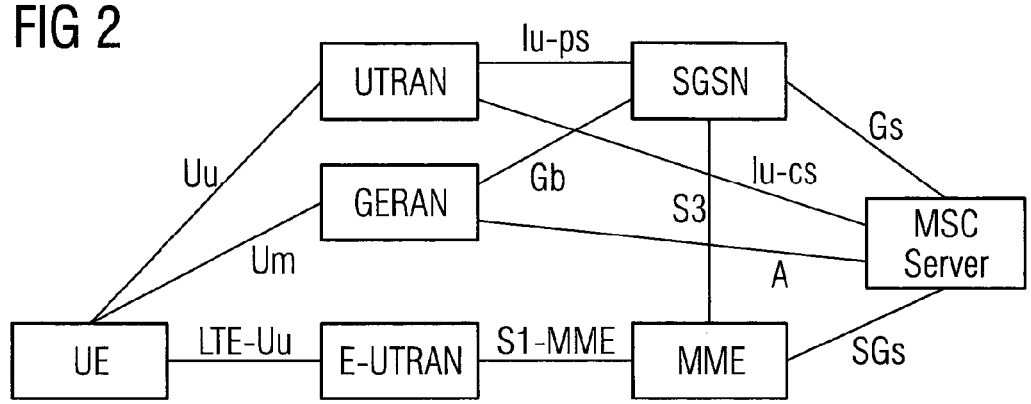
FIG. 2 shows a schematic diagram illustrating second example of a communication system architecture, in which exemplary embodiments of the present invention are applicable.
Figure 3:
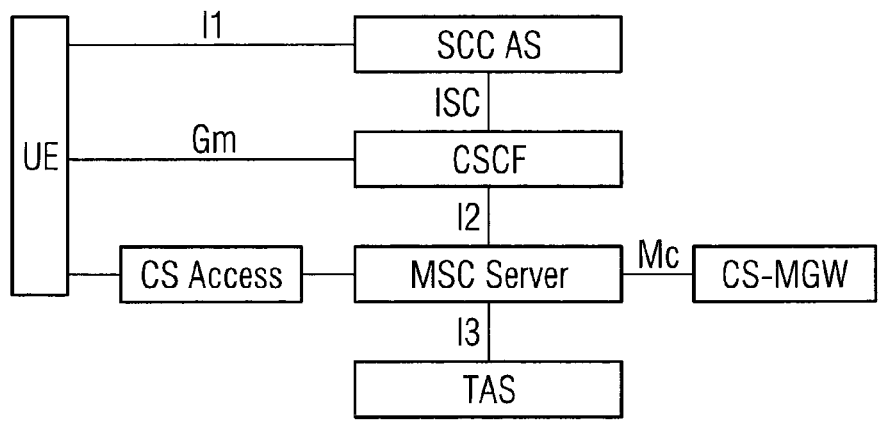
FIG. 3 shows a schematic diagram illustrating a centralized service architecture, in which exemplary embodiments of the present invention are applicable.

In particular, the present invention and its embodiments may be applicable in any cellular communication system and/or system deployment in which centralized services could be provided/executed on the basis of a registration of a switching entity as a contact point for a terminal. For example, exemplary embodiments of the present invention are applicable in an architecture according to any one of FIGS. 1 to 3, and/or in/for a scenario according to any one of FIGS. 4 and 5, as described above.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) service continuity in a centralized service network system, especially in a situation of terminal mobility between different switching entities.

Figure 6:
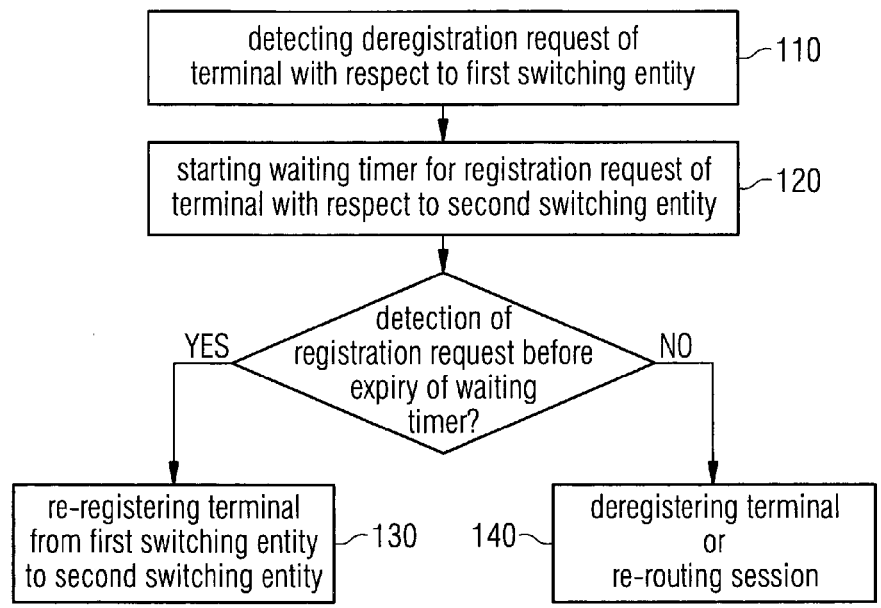
FIG. 6 shows a flowchart illustrating a first example of a method according to exemplary embodiments of the present invention.

FIG. 6 shows a flowchart illustrating a first example of a method according to exemplary embodiments of the present invention. This exemplary method is operable at or by any network entity managing the registration of a contact point for centralized services for terminals in a network system, such as e.g. the SCC-AS in an ICS architecture.

As shown in FIG. 6, a method according to exemplary embodiments of the present invention comprises an operation (S110) of detecting a deregistration request for deregistering a terminal with respect to a first switching entity from a registration in which the first switching entity is registered for the terminal as a contact point for centralized services, an operation (S120) of starting a waiting timer for waiting for a registration request for registering the terminal with respect to a second switching entity upon detection of said deregistration request, and an operation (S130) of re-registering the terminal in the registration such that the second switching entity is registered for the terminal as a contact point for centralized services upon detection of the registration request for registering the terminal with respect to the second switching entity before expiry of the waiting timer.

Although not shown, the exemplary method may additionally comprise instructing and/or executing re-routing of the session in question, i.e. a centralized service session of the terminal from the first switching entity to the second switching entity on the basis of the re-registration of the terminal.

Further, the exemplary method may additionally comprise an operation (S140) upon expiry of the waiting timer without detection of the registration request for registering the terminal with respect to the second switching entity. On the one hand, such operation (S140) may for example comprise deregistering the terminal from the registration, which is efficient in case of UE mobility to another ICS MSS (which issues a registration request). On the other hand, such operation (S140) may for example comprise instructing and/or executing re-routing of a session of the terminal (to a non-ICS MSS), even without a registered (ICS) contact point of a switching entity, which is efficient in case of UE mobility to a non-ICS MSS (which does not issue a registration request).

Figure 7:
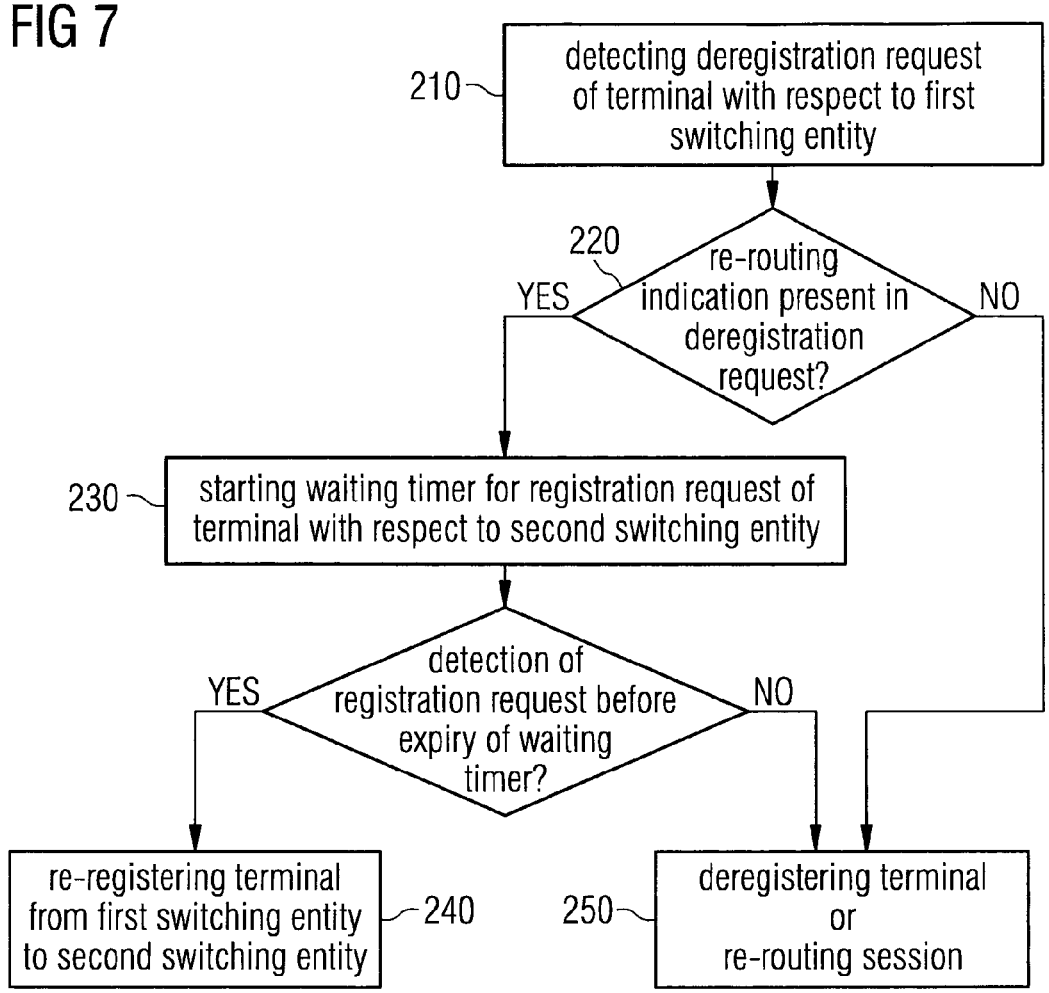
FIG. 7 shows a flowchart illustrating a second example of a method according to exemplary embodiments of the present invention.

FIG. 7 shows a flowchart illustrating a second example of a method according to exemplary embodiments of the present invention. This exemplary method is operable at or by any network entity managing the registration of a contact point for centralized services for terminals in a network system, such as e.g. the SCC-AS in an ICS architecture.

As compared with the method of FIG. 6, the method of FIG. 7 additionally comprises an operation of deciding on whether or not the waiting timer is to be started. Accordingly, a method according to exemplary embodiments of the present invention comprises an operation (S210) of detecting a deregistration request for deregistering a terminal with respect to a first switching entity from a registration in which the first switching entity is registered for the terminal as a contact point for centralized services, and an operation (S210) of determining non-/presence of an indication of a re-routing situation of the terminal, in which the terminal is re-routed from the first switching entity to the second switching entity, in the detected deregistration request. When the indication of the re-routing situation of the terminal is determined to be present in the detected deregistration request, the waiting timer is started, and the method proceeds with operations 230, 240 and 250 which correspond to operations 120, 130 and 140 of FIG. 6, respectively.

When the indication of the re-routing situation of the terminal is determined to be no present in the detected deregistration request, the waiting timer is not started, and the method proceeds with operation 250 which corresponds to operation 140 of FIG. 6.

According to exemplary embodiments of the present invention, the waiting timer for registration request may be set by the network entity managing the registration of a contact point for centralized services for terminals in a network system, such as e.g. the SCC-AS in an ICS architecture. Specifically, the waiting timer may be set by the SCC-AS when it receives a deregistration request from the S-CSCF, i.e. an indication that the UE has moved away from a MSS, so as to wait for a registration request, i.e. an indication that the UE has moved to another MSS. The registration request from the other MSS is issued when the MSS is ready with the location update procedure (in the circuit-switched domain). Accordingly, the waiting timer is (to be) set to be long enough to bridge the longest possible/conceivable (i.e. foreseeable or typically expectable) time period between receipt of the deregistration request and the registration request, both relating to mobility of the same UE, at the SCC-AS or a corresponding network entity. For example, the waiting timer is (to be set) to be long enough to enable execution of a location update procedure at a MSS. Otherwise, the waiting timer is (to be) set to be short enough, i.e. not excessive long, so as to avoid unnecessary delays in call setup, session re-routing, or the like.

In practice, the waiting timer could be configurable from 0.1 s to 10 s, e.g. with steps of 0.1 s, as a non-limiting numerical example. A configurable parameter relating to the waiting timer can be implemented in many ways. Preferably, the waiting timer could be manually configurable by an operator, as the duration of the location update procedure can be different in each operator's network. Also, the waiting timer could be configurable for each PLMN (VPLMN), to/in which the target UE can roam, as the duration of the location update procedure can be different in each PLMN (VPLMN).

In the following, examples of procedures according to exemplary embodiments of the present invention in the first exemplary re-routing scenario (as exemplified by FIG. 4 above) will be described with reference to FIGS. 8 and 9. Namely, these procedures relate to a re-routing scenario, in which a deregistration request from ICS MSS_1 is issued before a registration request from ICS MSS_2 (as a result of the fact that MAP Cancel Location is issued by the HLR prior to MAP Update Location Response).

In this regard, it is assumed that the UE is registered to ICS MSS_1 over the SGs interface, and ICS MSS_1 is registered for the UE as contact point for ICS in the S-CSCF and the SCC-AS. Further, it is assumed that the UE is to be re-routed from ICS MSS_1 (serving an E-UTRAN cell representing a source cell) to ICS MSS_2 (serving a GERAN/UTRAN cell representing a target cell) due to a CSFB mechanism.

Figure 4:
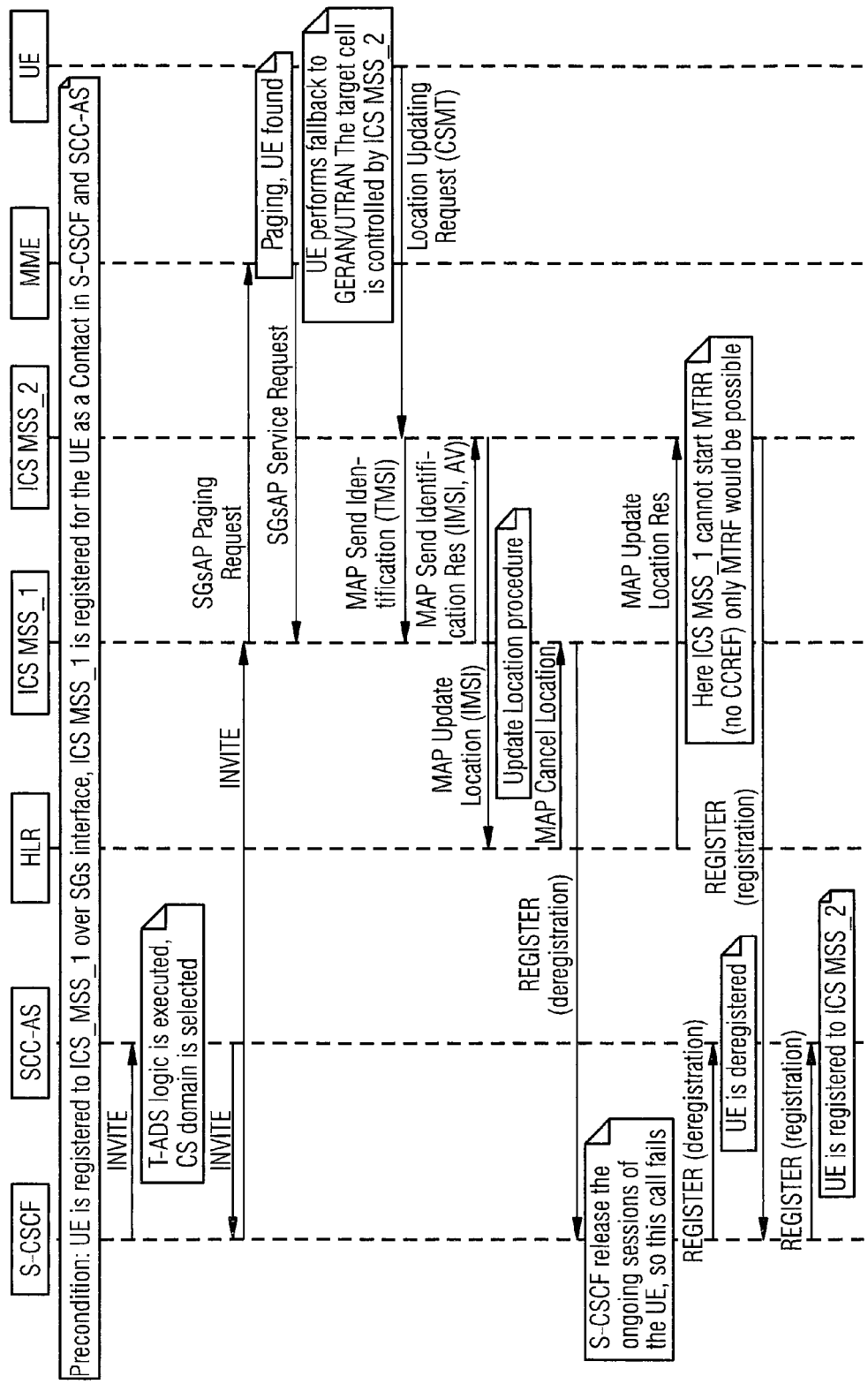
FIG. 4 shows a signaling diagram of a conventional procedure in a first exemplary re-routing scenario.
Figure 8B:
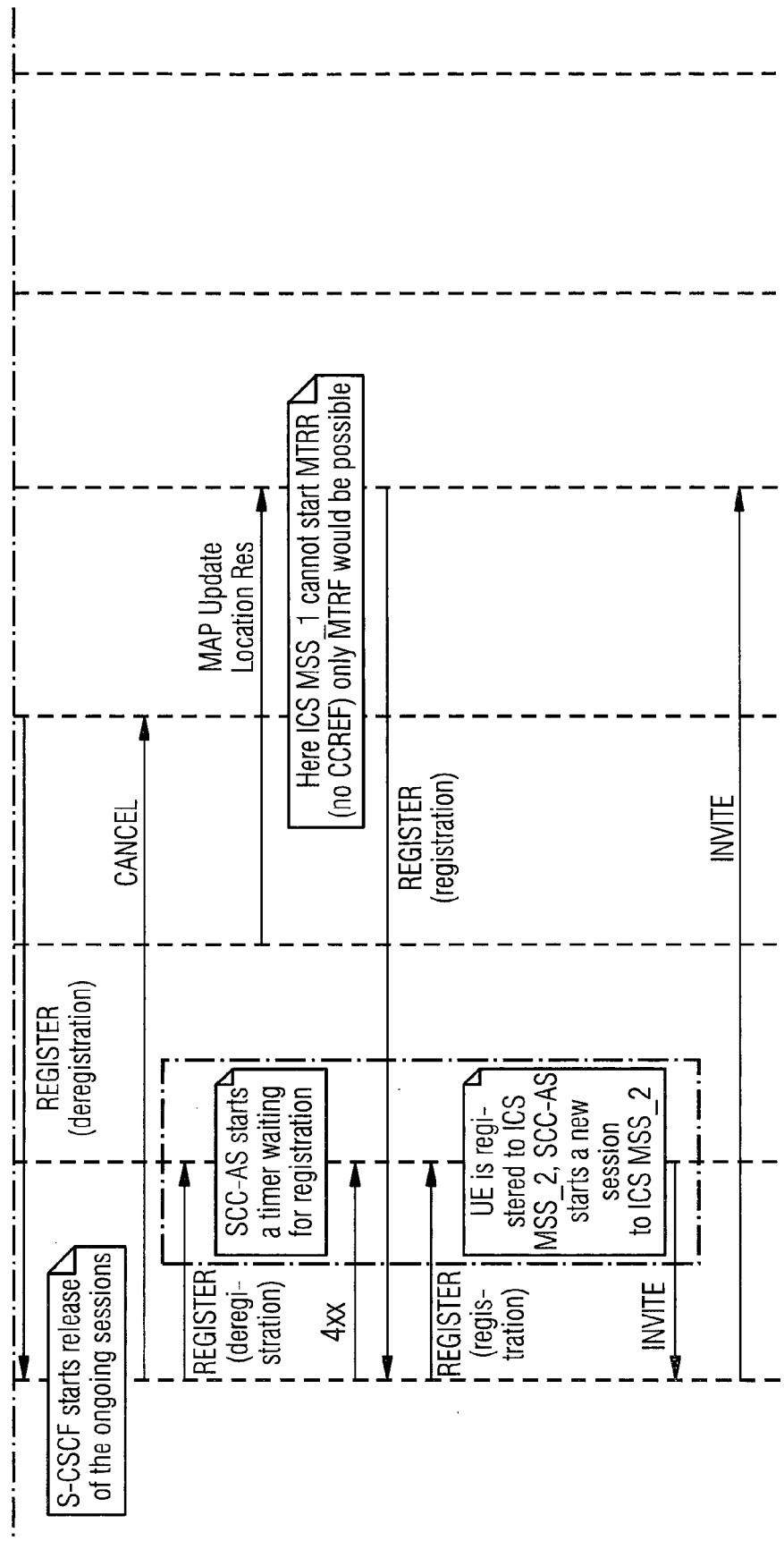
FIG. 8 shows a signaling diagram of a first example of a procedure in the first exemplary re-routing scenario according to exemplary embodiments of the present invention.

In FIGS. 8 and 9, the initial procedure before issuance of the deregistration request by the ICS MSS_1 is the same as in the procedure of FIG. 4, as indicated by a dashed line. The operability of the SCC-AS according to exemplary embodiments of the present invention is indicated by a dotted box.

FIG. 8 shows a signaling diagram of a first example of a procedure in the first exemplary re-routing scenario according to exemplary embodiments of the present invention.

Upon receipt of the deregistration request from the ICS MSS_1, the S-CSCF releases the ongoing session of the UE and sends a deregistration request to the SCC-AS, and then releases the ongoing session. In the present example, the session release towards the SCC-AS is accomplished by way of sending a 4xx message (i.e. a SIP response message responsive to the preceding INVITE message including/ representing a session establishment request from the SCC-AS to the S-CSCF) from the S-CSCF to the SCC-AS. Upon receipt (and corresponding detection) of the deregistration request with respect to the ICS MSS_1 from the S-CSCF, the SCC-AS holds (or terminates) the session release, and starts a waiting timer for a registration request with respect to the ICS MSS_2. Upon receipt of the registration request from the ICS MSS_2, the S-CSCF sends a registration request to the SCC-AS. Upon receipt (and corresponding detection) of the registration request with respect to the ICS MSS_2 from the S-CSCF before expiry of the waiting timer, the SCC-AS re-registers the UE such that the ICS MSS_2 is registered for the UE as contact point for ICS. Accordingly, the session (i.e. the I1 session) of the UE can be re-routed from the ICS MSS_1 to the ICS_MSS 2, e.g. the session to the ICS MSS_1 can be released and a new session to the ICS MSS_2 can be started. That is, in response to UE re-registration, the SCC-AS may instruct and/or execute a corresponding re-routing of a centralized service session of the UE, which is indicated by the INVITE message from the SCC-As to the S-CSCF. As the UE is not meanwhile deregistered at the SCC-AS, service continuity is ensured.

When no registration request with respect to the ICS MSS_2 is received (and correspondingly detected) at the SCC-AS before expiry of the waiting timer, the SCC-AS could recognize that the previous deregistration request is (probably) not induced by a re-routing situation of the UE, and could deregister the UE from the locally managed registration, or could re-route the ongoing session to a non-ICS MSS. Accordingly, the ongoing session is released and will not be re-routed upon a later receipt (and corresponding detection) of a registration request. Rather, the session could be delivered to the CS domain via a MGCF. When the target switching entity, i.e. the switching entity to which the UE is to be re-routed, is not an ICS MSS, it is not registered as a contact point for centralized services for the UE in the S-CSCF and the SCC-AS. In this case, the waiting timer at the SCC-AS will expire, and the SCC-AS could use a MAP SRI based session routing to the target switching entity.

FIG. 9 shows a signaling diagram of a second example of a procedure in the first exemplary re-routing scenario according to exemplary embodiments of the present invention.

Upon receipt of the deregistration request from the ICS MSS_1, the S-CSCF does not release the ongoing session of the UE, if this session was routed to the ICS MSS_1 currently requesting deregistration, but sends a deregistration request to the SCC-AS. Upon receipt (and corresponding detection) of the deregistration request with respect to the ICS MSS_1 from the S-CSCF, the SCC-AS starts a waiting timer for a registration request with respect to the ICS MSS_2. Upon receipt of the registration request from the ICS MSS_2, the S-CSCF again skis the session release of the ongoing session, but sends a registration request to the SCC-AS. Upon receipt (and corresponding detection) of the registration request with respect to the ICS MSS_2 from the S-CSCF before expiry of the waiting timer, the SCC-AS re-registers the UE such that the ICS MSS_2 is registered for the UE as contact point for ICS. Accordingly, the session (i.e. the I1 session) of the UE can be re-routed from the ICS MSS_1 to the ICS_MSS 2, e.g. the session to the ICS MSS_1 can be released and a new session to the ICS MSS_2 can be started. That is, in response to UE re-registration, the SCC-AS may instruct and/or execute a corresponding re-routing of a centralized service session of the UE, which is indicated by the INVITE message from the SCC-As to the S-CSCF. As the UE is not meanwhile deregistered at the SCC-AS, service continuity is ensured.

When no registration request with respect to the ICS MSS_2 is received (and correspondingly detected) at the SCC-AS before expiry of the waiting timer, the SCC-AS could recognize that the previous deregistration request is (probably) not induced by a re-routing situation of the UE, and could deregister the UE from the locally managed registration, or could re-route the ongoing session to a non-ICS MSS. Accordingly, the ongoing session is released and will not be re-routed upon a later receipt (and corresponding detection) of a registration request. Rather, the session could be delivered to the CS domain via a MGCF. When the target switching entity, i.e. the switching entity to which the UE is to be re-routed, is not an ICS MSS, it is not registered as a contact point for centralized services for the UE in the S-CSCF and the SCC-AS. In this case, the waiting timer at the SCC-AS will expire, and the SCC-AS could use a MAP SRI based session routing to the target switching entity.

In any one of the procedures of FIGS. 8 and 9, the decision for holding the session release and/or starting the waiting timer by the SCC-AS can be based on the locally managed registration (i.e. the knowledge that an ongoing session was originally routed to the ICS MSS_1) in connection with receipt of the deregistration request with respect to the ICS MSS_1. As indicated above, the decision for holding the session release and/or starting the waiting timer can optionally be based on presence of an indication of a re-routing situation of the UE in the deregistration request from the S-CSCF. Such indication can be included by the ICS MSS_1 in its deregistration request, and will be transparently transported to the SCC-AS by the S-CSCF.

In the following, examples of procedures according to exemplary embodiments of the present invention in the second exemplary re-routing scenario (as exemplified by FIG. 5 above) will be described with reference to FIGS. 10 and 11. Namely, these procedures relate to a re-routing scenario, in which a deregistration request from ICS MSS_1 is issued after a registration request from ICS MSS_2 (as a result of the fact that, while MAP Cancel Location is issued by the HLR prior to MAP Update Location Response, a delay timer is used at the ICS MSS_1).

In this regard, it is assumed that the UE is registered to ICS MSS_1 over the SGs interface, and ICS MSS_1 is registered for the UE as contact point for ICS in the S-CSCF and the SCC-AS. Further, it is assumed that the UE is to be re-routed from ICS MSS_1 (serving an E-UTRAN cell representing a source cell) to ICS MSS_2 (serving a GERAN/UTRAN cell representing a target cell) due to a CSFB mechanism.

Figure 5B:
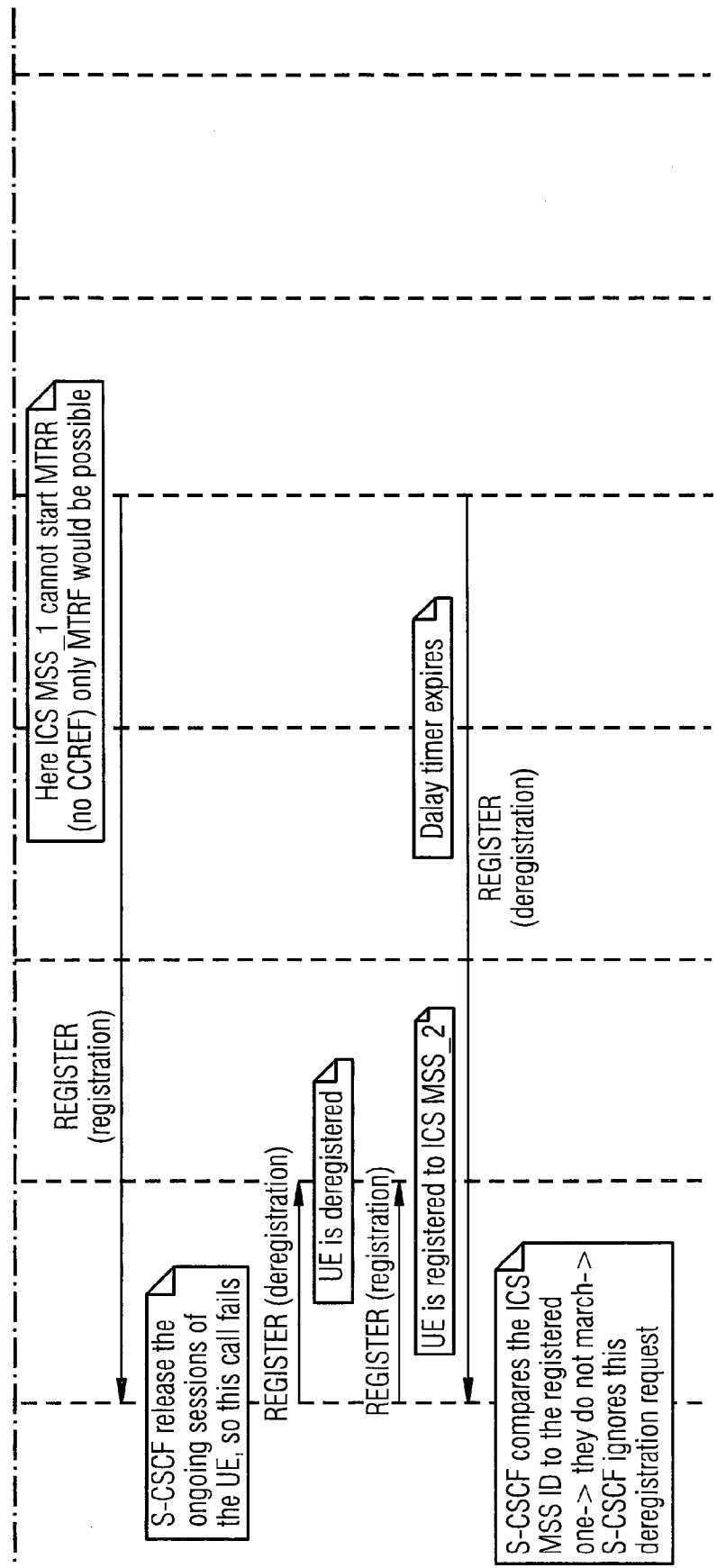
FIG. 5 shows a signaling diagram of a conventional procedure in a second exemplary re-routing scenario.

In FIGS. 10 and 11, the initial procedure before issuance of the registration request by the ICS MSS_2 is the same as in the procedure of FIG. 5, as indicated by a dashed line. The operability of the SCC-AS according to exemplary embodiments of the present invention is indicated by a dotted box.

FIG. 10 shows a signaling diagram of a first example of a procedure in the second exemplary re-routing scenario according to exemplary embodiments of the present invention.

Upon receipt of the registration request from the ICS MSS_2, the S-CSCF does not release the ongoing session of the UE, if this session was not routed to the ICS MSS_2 currently requesting registration, but sends a deregistration request with respect to the ICS MSS_1 to the SCC-AS. Upon receipt (and corresponding detection) of the deregistration request with respect to the ICS MSS_1 from the S-CSCF, the SCC-AS starts a waiting timer for a registration request with respect to the ICS MSS_2. Then, the S-CSCF sends a registration request with respect to the ICS MSS_2 to the SCC-AS. Upon receipt (and corresponding detection) of the registration request with respect to the ICS MSS_2 from the S-CSCF before expiry of the waiting timer, the SCC-AS re-registers the UE such that the ICS MSS_2 is registered for the UE as contact point for ICS. Accordingly, the session (i.e. the I1 session) of the UE can be re-routed from the ICS MSS_1 to the ICS_MSS 2, e.g. the session to the ICS MSS_1 can be released and a new session to the ICS MSS_2 can be started. That is, in response to UE re-registration, the SCC-AS may instruct and/or execute a corresponding re-routing of a centralized service session of the UE, which is indicated by the INVITE message from the SCC-As to the S-CSCF. As the UE is not meanwhile deregistered at the SCC-AS, service continuity is ensured.

When no registration request with respect to the ICS MSS_2 is received (and correspondingly detected) at the SCC-AS before expiry of the waiting timer, the SCC-AS could recognize that the previous deregistration request is (probably) not induced by a re-routing situation of the UE, and could deregister the UE from the locally managed registration, or could re-route the ongoing session to a non-ICS MSS. Accordingly, the ongoing session is released and will not be re-routed upon a later receipt (and corresponding detection) of a registration request. Rather, the session could be delivered to the CS domain via a MGCF. When the target switching entity, i.e. the switching entity to which the UE is to be re-routed, is not an ICS MSS, it is not registered as a contact point for centralized services for the UE in the S-CSCF and the SCC-AS. In this case, the deregistration request with respect to the ICS MSS_1 would arrive first at the S-CSCF and the SCC-AS, the waiting timer at the SCC-AS will be started, and then, when the waiting timer at the SCC-AS expires, the SCC-AS could use a MAP SRI based session routing to the target switching entity.

FIG. 11 shows a signaling diagram of a second example of a procedure in the second exemplary re-routing scenario according to exemplary embodiments of the present invention.

Upon receipt of the registration request from the ICS MSS_2, the S-CSCF releases the ongoing session of the UE and sends a deregistration request with respect to the ICS MSS_1 to the SCC-AS. Like in the example of FIG. 8, the session release towards the SCC-AS is accomplished by way of sending a 4xx message (i.e. a SIP response message responsive to the preceding INVITE message including/representing a session establishment request from the SCC-AS to the S-CSCF) from the S-CSCF to the SCC-AS. Upon receipt (and corresponding detection) of the deregistration request with respect to the ICS MSS_1 from the S-CSCF, the SCC-AS holds (or terminates) the session release, and starts a waiting timer for a registration request with respect to the ICS MSS_2. Then, the S-CSCF sends a registration request with respect to the ICS MSS_2 to the SCC-AS. Upon receipt (and corresponding detection) of the registration request with respect to the ICS MSS_2 from the S-CSCF before expiry of the waiting timer, the SCC-AS re-registers the UE such that the ICS MSS_2 is registered for the UE as contact point for ICS. Accordingly, the session (i.e. the I1 session) of the UE can be re-routed from the ICS MSS_1 to the ICS_MSS 2, e.g. the session to the ICS MSS_1 can be released and a new session to the ICS MSS_2 can be started.

That is, in response to UE re-registration, the SCC-AS may instruct and/or execute a corresponding re-routing of a centralized service session of the UE, which is indicated by the INVITE message from the SCC-As to the S-CSCF. As the UE is not meanwhile deregistered at the SCC-AS, service continuity is ensured.

When no registration request with respect to the ICS MSS_2 is received (and correspondingly detected) at the SCC-AS before expiry of the waiting timer, the SCC-AS could recognize that the previous deregistration request is (probably) not induced by a re-routing situation of the UE, and could deregister the UE from the locally managed registration, or could re-route the ongoing session to a non-ICS MSS. Accordingly, the ongoing session is released and will not be re-routed upon a later receipt (and corresponding detection) of a registration request. Rather, the session could be delivered to the CS domain via a MGCF. When the target switching entity, i.e. the switching entity to which the UE is to be re-routed, is not an ICS MSS, it is not registered as a contact point for centralized services for the UE in the S-CSCF and the SCC-AS. In this case, the deregistration request with respect to the ICS MSS_1 would arrive first at the S-CSCF and the SCC-AS, the waiting timer at the SCC-AS will be started, and then, when the waiting timer at the SCC-AS expires, the SCC-AS could use a MAP SRI based session routing to the target switching entity.

In any one of the procedures of FIGS. 10 and 11, the decision for holding the session release and/or starting the waiting timer by the SCC-AS can be based on the locally managed registration (i.e. the knowledge that an ongoing session was originally routed to the ICS MSS_1) in connection with receipt of the deregistration request with respect to the ICS MSS_1. As indicated above, the decision for holding the session release and/or starting the waiting timer can optionally be based on presence of an indication of a re-routing situation of the UE in the deregistration request from the S-CSCF. Such indication can be included by the ICS MSS_2 in its registration request, and will be transparently transported to the SCC-AS by the S-CSCF.

As evident from the above-described exemplary procedures of FIGS. 8 to 11, exemplary embodiments of the present invention are capable of overcoming the problem in terms of service continuity of conventional re-routing procedures (as described in connection with FIGS. 4 and 5), i.e. the problem in terms of service continuity when a subscriber is registered to a centralized network system such as the ICS system (e.g. centralized CS/IMS domain), e.g. over the EPS.

In view of the above-described exemplary procedures, exemplary embodiments of the present invention are capable of achieving an appropriate interworking of a centralized network system such as the ICS system (e.g. centralized CS/IMS domain) and CS fallback (CSFB) mechanisms according to 3GPP specifications. Stated in other words, exemplary embodiments of the present invention can achieve that the ICS architecture functions properly (including appropriate completion of a CSFB mechanism) even when a change of a switching entity (such as e.g. a MSC, a MSC server or a MSS) happens in a re-routing situation during execution of the CSFB mechanism.

Accordingly, exemplary embodiments of the present invention are for example effective in a VoLTE architecture/implementation, when CSFB is deployed as a voice service component in LTE/LTE-A.

By virtue of exemplary embodiments of the present invention, as evident from the above, service continuity in a centralized service network system can be enabled/realized, especially in a re-routing situation of a terminal. Specifically, service continuity can be enabled/realized in a centralized service network system irrespective of the cause of the re-routing situation. For example, such re-routing situation, in/for which exemplary embodiments of the present invention are applicable for enabling/realizing service continuity, may be caused/induced (and thus relate to) a CS fallback mechanism (i.e. transfer of a terminal from (a switching entity in a) packet-switched network access to (a switching entity in a) circuit-switched network access), or a CS-internal mechanism (i.e. transfer of a terminal from (a switching entity in a) circuit-switched network access to another (switching entity in a) circuit-switched network access), or any other kind of mechanism, as long as the terminal is to be re-routed from one switching entity to another switching entity.

The above-described methods, procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 12, while for the sake of brevity reference is made to the detailed description of respective corresponding configurations/setups, schemes, methods and functionality, principles and operations according to FIGS. 1 to 11.

Figure 12:
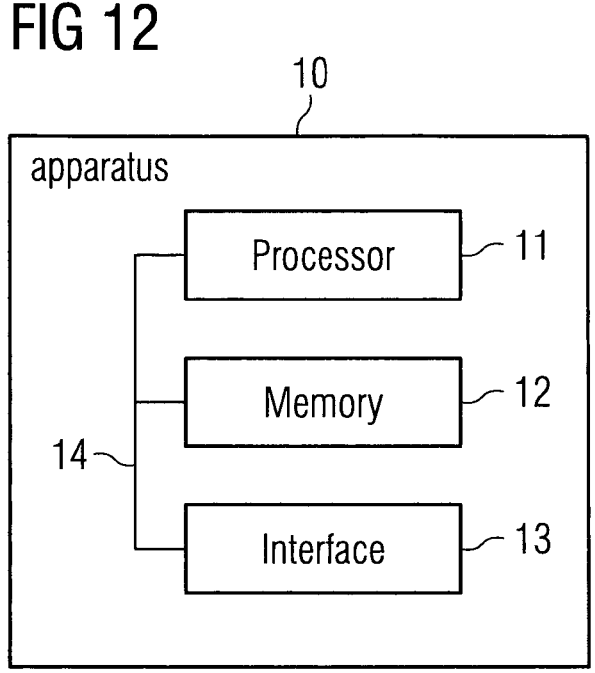
FIG. 12 shows a schematic diagram illustrating an exemplary structure of apparatuses according to exemplary embodiments of the present invention.

FIG. 12 shows a schematic diagram illustrating an exemplary structure of apparatuses according to exemplary embodiments of the present invention.

In FIG. 12, the solid line blocks are basically configured to perform respective operations as described above. The entirety of solid line blocks are basically configured to perform the methods and operations as described above, respectively. With respect to FIG. 12, it is to be noted that the individual blocks are meant to illustrate respective functional blocks implementing a respective function, process or procedure, respectively. Such functional blocks are implementation-independent, i.e. may be implemented by means of any kind of hardware or software, respectively. The lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown.

Further, in FIG. 12, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

As indicated in FIG. 12, according to exemplary embodiments of the present invention, the apparatus 10 may comprise at least one processor 11 and at least one memory 12 (and possibly also at least one interface 13), which may be connected by a bus 14 or the like, respectively.

The processor 11 and/or the interface 13 of the apparatus 10 may also include a modem or the like to facilitate communication over a (hardwire or wireless) link, respectively. The interface 13 of the apparatus 10 may include a suitable transceiver coupled to one or more antennas or communication means for (hardwire or wireless) communications with the linked or connected device(s), respectively. The interface 13 of the apparatus 10 is generally configured to communicate with at least one other apparatus.

The memory 12 of the apparatus 10 may store respective programs assumed to include program instructions or computer program code that, when executed by the respective processor, enables the respective electronic device or apparatus to operate in accordance with the exemplary embodiments of the present invention. For example, the memory 12 of the apparatus 10 may store a registration, waiting timer configuration information, or the like.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 10 is suitable for use in practicing the exemplary embodiments of the present invention, as described herein.

The thus illustrated apparatus 10 may represent a (part of a) network entity managing the registration of a contact point for centralized services for terminals in a network system, such as a SCC-AS entity, according to exemplary embodiments of the present invention, and it may be configured to perform a procedure and/or exhibit a functionality as described (for the SCC-AS) in any one of FIGS. 6 to 11.

When in the subsequent description it is stated that the processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 (possibly together with computer program code stored in the memory 12) is configured to perform detecting a deregistration request for deregistering a terminal with respect to a first switching entity from a registration in which the first switching entity is registered for the terminal as a contact point for centralized services, starting a waiting timer for waiting for a registration request for registering the terminal with respect to a second switching entity upon detection of said deregistration request, and re-registering the terminal in the registration such that the second switching entity is registered for the terminal as a contact point for centralized services upon detection of the registration request for registering the terminal with respect to the second switching entity before expiry of the waiting timer.

Accordingly, stated in other words, the apparatus 10 at least comprises respective means for detecting a deregistration request, means for starting a waiting timer, and means for re-registering the terminal in the registration.

According to various modifications and/or developments, the apparatus 10 or its processor 11 (possibly together with computer program code stored in the memory 12) is configured to perform, or—stated differently—comprises means for deregistering the terminal from the registration or instructing and/or executing re-routing of a session of the terminal upon expiry of the waiting timer without detection of the registration request for registering the terminal with respect to the second switching entity, and/or determining non-/presence of an indication of a re-routing situation of the terminal, in which the terminal is re-routed from the first switching entity to the second switching entity, in the detected deregistration request, wherein the waiting timer is started when the indication of the re-routing situation of the terminal is determined to be present in the detected deregistration request, and wherein the waiting timer is not started and the terminal is deregistered from the registration when the indication of the re-routing situation of the terminal is determined to be not present in the detected deregistration request, and/or instructing and/or executing re-routing of a centralized service session of the terminal from the first switching entity to the second switching entity on the basis of the re-registration of the terminal.

Similarly, the thus illustrated apparatus 10 may represent a (part of a) network entity managing or referring to the registration of a contact point for centralized services for terminals in a network system, such as a S-CSCF entity, according to exemplary embodiments of the present invention, and it may be configured to perform a procedure and/or exhibit a functionality as described (for the S-CSCF) in any one of FIGS. 8 to 11.

For further details regarding the operability/functionality of the individual apparatuses, reference is made to the above description in connection with any one of FIGS. 1 to 11, respectively.

According to exemplarily embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing service continuity in a centralized service network system. Such measures exemplarily comprise detecting a deregistration request for deregistering a terminal with respect to a first switching entity from a registration in which the first switching entity is registered for the terminal as a contact point for centralized services, starting a waiting timer for waiting for a registration request for registering the terminal with respect to a second switching entity upon detection of said deregistration request, and re-registering the terminal in the registration such that the second switching entity is registered for the terminal as a contact point for centralized services upon detection of the registration request for registering the terminal with respect to the second switching entity before expiry of the waiting timer.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
CS Circuit-Switched
CSCF Call State Control Function
CSFB Circuit-Switched Fallback
CS-MGW Circuit-Switched Media Gateway
E-UTRAN Evolved UTRAN
EDGE Enhanced Data rates for Global Evolution
EPS Evolved Packet System
GERAN GSM/EDGE Radio Access Network
GPRS General Packet Radio Service
GSM Global System for Mobile Communication
HLR Home Location Register
HSS Home Subscriber Server
ICS IMS Centralized Service
IMS IP Multimedia Subsystem
IP Internet Protocol
LTE Long Term Evolution
LTE-A Long Term Evolution Advanced
MAP Mobile Application Part
MGCF Media Gateway Control Function
MME Mobility Management Entity
MSC Mobile Switching Center
MSS Mobile Switching System
MT Mobile-Terminated
MTRF Mobile-Terminated Roaming Forwarding
MTRR Mobile-Terminated Roaming Retry
PCRF Policy and Charging Rules Function
PDN-GW Packet Data Network Gateway
PLMN Public Land Mobile Network
PSS Packet-switched streaming service
S-CSCF Serving Call State Control Function
S-GW Serving Gateway
SCC-AS Service Centralization and Continuity Application Server
SGSN Serving GPRS Support Node
SIP Session Initiation Protocol
SMS Short Message Service
SRI Send Routing Info
T-ADS Terminating Access Domain Selection
TAS Telephony Application Server
TMSI Temporary Mobile Subscriber Identity
UE User Equipment
UMTS Universal Mobile Telecommunications System
USSD Unstructured Supplementary Service Data
UTRAN UMTS Terrestrial Radio Access Network
VLR Visitor Location Register
VoLTE Voice-over-LTE
VPLMN Visited Public Land Mobile Network

The invention claimed is:

1. A method, comprising:
detecting a deregistration request for deregistering a terminal with respect to a first switching entity from a registration in which the first switching entity is registered for the terminal as a contact point for centralized services;
starting a waiting timer for waiting for a registration request for registering the terminal with respect to a second switching entity upon detection of said deregistration request; and
re-registering the terminal in the registration such that the second switching entity is registered for the terminal as a contact point for centralized services upon detection of the registration request for registering the terminal with respect to the second switching entity before expiry of the waiting timer.

2. The method according to claim 1, comprising:
deregistering the terminal from the registration or instructing and/or executing re-routing of a session of the terminal upon expiry of the waiting timer without detection of the registration request for registering the terminal with respect to the second switching entity.

3. The method according to claim 1, comprising:
determining non-presence of an indication of a re-routing situation of the terminal, in which the terminal is re-routed from the first switching entity to the second switching entity, in the detected deregistration request,
wherein the waiting timer is started when the indication of the re-routing situation of the terminal is determined to be present in the detected deregistration request, and
wherein the waiting timer is not started and the terminal is deregistered from the registration when the indication of the re-routing situation of the terminal is determined to be not present in the detected deregistration request.

4. The method according to claim 1, comprising:
instructing or executing re-routing of a centralized service session of the terminal from the first switching entity to the second switching entity on the basis of the re-registration of the terminal.

5. The method according to claim 1, wherein
the deregistration request relates to a re-routing situation of the terminal, in which the terminal is re-routed from the first switching entity to the second switching entity.

6. The method according to claim 5, wherein
the re-routing situation relates to a circuit-switched fallback mechanism, in which the terminal is transferred from a switching entity in a packet-switched network access to a switching entity in a circuit-switched network access, or a mechanism, in which the terminal is transferred from a switching entity in a circuit-switched network access to another switching entity in a circuit-switched network access.

7. The method according to claim 5, wherein
a deregistration request is sent from the first switching entity to a call state control function before a registration request is sent from the second switching entity to the call state control function, or
a registration request is sent from the second switching entity to a call state control function before a deregistration request is sent from the first switching entity to the call state control function.

8. The method according to claim 1, wherein
the centralized services comprise IP multimedia subsystem centralized services, or
at least the first switching entity of the first and second switching entities comprises one of a mobile switching system, a mobile switching center and a mobile switching center server of an IP multimedia subsystem centralized service system.

9. The method according to claim 1, wherein
the method is operable at or by a network entity managing the registration of a contact point for centralized services for terminals in a network system, or
the method is operable in an IP multimedia subsystem centralized service system.

10. The method according to claim 9, wherein
the method is operable at or by a service centralization and continuity application server.

11. An apparatus, comprising:
an interface configured to communicate with at least another apparatus, a memory configured to store computer program code, and a processor configured to cause the apparatus to perform:

detecting a deregistration request for deregistering a terminal with respect to a first switching entity from a registration in which the first switching entity is registered for the terminal as a contact point for centralized services, starting a waiting timer for waiting for a registration request for registering the terminal with respect to a second switching entity upon detection of said deregistration request, and re-registering the terminal in the registration such that the second switching entity is registered for the terminal as a contact point for centralized services upon detection of the registration request for registering the terminal with respect to the second switching entity before expiry of the waiting timer.

12. The apparatus according to claim 11, wherein the processor is configured to cause the apparatus to perform:

deregistering the terminal from the registration or instructing or executing re-routing of a session of the terminal upon expiry of the waiting timer without detection of the registration request for registering the terminal with respect to the second switching entity.

13. The apparatus according to claim 11, wherein the processor is configured to cause the apparatus to perform:

determining non-presence of an indication of a re-routing situation of the terminal, in which the terminal is re-routed from the first switching entity to the second switching entity, in the detected deregistration request, wherein the processor is configured to cause the apparatus to start the waiting timer when the indication of the re-routing situation of the terminal is determined to be present in the detected deregistration request, and to not start the waiting timer and deregister the terminal from the registration when the indication of the re-routing situation of the terminal is determined to be not present in the detected deregistration request.

14. The apparatus according to claim 11, wherein the processor is configured to cause the apparatus to perform:

instructing or executing re-routing of a centralized service session of the terminal from the first switching entity to the second switching entity on the basis of the re-registration of the terminal.

15. The apparatus according to claim 11, wherein the deregistration request relates to a re-routing situation of the terminal, in which the terminal is re-routed from the first switching entity to the second switching entity.

16. The apparatus according to claim 15, wherein the re-routing situation relates to a circuit-switched fallback mechanism, in which the terminal is transferred from a switching entity in a packet-switched network access to a switching entity in a circuit-switched network access, or a mechanism, in which the terminal is transferred from a switching entity in a circuit-switched network access to another switching entity in a circuit-switched network access.

17. The apparatus according to claim 15, wherein a deregistration request is sent from the first switching entity to a call state control function before a registration request is sent from the second switching entity to the call state control function, or a registration request is sent from the second switching entity to a call state control function before a deregistration request is sent from the first switching entity to the call state control function.

18. The apparatus according to claim 11, wherein the centralized services comprise IP multimedia subsystem centralized services, or at least the first switching entity of the first and second switching entities comprises one of a mobile switching system, a mobile switching center and a mobile switching center server of an IP multimedia subsystem centralized service system.

19. The apparatus according to claim 11, wherein the apparatus is operable as or at a network entity managing the registration of a contact point for centralized services for terminals in a network system, or the apparatus is operable in an IP multimedia subsystem centralized service system.

20. The apparatus according to claim 19, wherein the apparatus is operable as or at a service centralization and continuity application server.

21. A computer program product comprising computer-executable computer program code embodied on a non-transitory computer-readable medium which, when the program code is executed on a computer, is configured to cause the computer to carry out the method according to claim 1.

* * * * *